United States Patent

Gowing et al.

[11] Patent Number: 6,053,064
[45] Date of Patent: Apr. 25, 2000

[54] LUMBAR SUPPORT SCREW ACTUATOR

[75] Inventors: John P. Gowing, Joplin; Donald D. Mundell, Carthage, both of Mo.

[73] Assignee: L & P Property Management Company, South Gate, Calif.

[21] Appl. No.: 09/071,172

[22] Filed: May 1, 1998

[51] Int. Cl.[7] .............................. F16H 25/20; F16C 1/10; A47C 3/025
[52] U.S. Cl. ..................... 74/89.15; 74/501.6; 74/502.4; 74/502.6; 74/509; 29/453; 29/469; 297/284.7; 297/284.8; 411/386
[58] Field of Search .................................. 74/89.15, 459, 74/424.8 R, 489, 502.4, 501.6, 502.6, 509; 297/284.7, 284.8; 411/333, 264, 386; 29/453, 469

[56] References Cited

U.S. PATENT DOCUMENTS

| | | |
|---|---|---|
| 674,199 | 5/1901 | Cuthbert . |
| 2,195,400 | 4/1940 | Arens ..................................... 74/501.6 |
| 2,335,000 | 11/1943 | Edwards . |
| 2,386,767 | 10/1945 | Arens ....................................... 74/502 |
| 2,991,124 | 7/1961 | Schwarz . |
| 3,247,562 | 4/1966 | Davies . |
| 3,349,638 | 10/1967 | Houk . |
| 3,416,390 | 12/1968 | Houk . |
| 3,563,106 | 2/1971 | Goodman . |
| 3,570,323 | 3/1971 | Learmont . |
| 3,570,324 | 3/1971 | Conrad . |
| 3,656,358 | 4/1972 | Kopp . |
| 3,732,744 | 5/1973 | Rowland . |
| 3,744,339 | 7/1973 | Martinson . |
| 3,757,612 | 9/1973 | Schaefer . |
| 3,815,434 | 6/1974 | Seger . |
| 3,890,000 | 6/1975 | Easley . |
| 4,041,795 | 8/1977 | Rekoff, Jr. . |
| 4,050,738 | 9/1977 | Griffiths . |
| 4,124,252 | 11/1978 | Safir . |
| 4,159,847 | 7/1979 | Arai . |
| 4,266,437 | 5/1981 | Obergfell . |
| 4,295,681 | 10/1981 | Gregory . |
| 4,309,058 | 1/1982 | Barley . |
| 4,316,631 | 2/1982 | Lenz et al. . |

(List continued on next page.)

FOREIGN PATENT DOCUMENTS

| | | |
|---|---|---|
| 0706338 | of 0000 | European Pat. Off. . |
| 0540481B1 | 12/1995 | European Pat. Off. . |
| 0563709B1 | 10/1996 | European Pat. Off. . |
| 366246 | 9/1906 | France . |
| 3307541A1 | 9/1984 | Germany . |
| 366246 | 9/1906 | Italy . |
| 440624 | 10/1948 | Italy . |
| 451891 | 9/1949 | Italy . |
| 451891 | 7/1950 | Italy . |
| 61-163810 | 7/1966 | Japan . |
| 6030817 | 2/1985 | Japan . |
| 2159408 | 6/1990 | Japan . |
| 2208157 | 8/1990 | Japan . |
| 197037 | 5/1923 | United Kingdom . |
| 431197 | 6/1935 | United Kingdom . |

(List continued on next page.)

Primary Examiner—Allan D. Herrmann
Attorney, Agent, or Firm—Wood, Herron & Evans, LLP

[57] ABSTRACT

An actuator for manipulating a bowden cable assembly of a lumbar support structure includes a housing having a longitudinal passage and a screw coupled to a cable and operable for moving in the housing passage. A threaded nut is operable for rotating and moving the screw through the housing passage. A barrel is configured for receiving the bowden cable assembly and is operable for providing movement of the cable of a bowden cable assembly completely therethrough and further operable for engaging a sleeve of the bowden cable assembly for preventing movement of the sleeve completely therethrough. The barrel is fixedly coupled to the housing to fix the movement of the bowden cable sleeve with respect to the housing passage such that movement of the screw in the housing is operable for drawing the cable through the fixed sleeve of the bowden cable structure for manipulating a lumbar support structure.

19 Claims, 4 Drawing Sheets

U.S. PATENT DOCUMENTS

| | | |
|---|---|---|
| 4,434,570 | 3/1984 | Roos . |
| 4,448,392 | 5/1984 | Ladewski ........................... 411/334 X |
| 4,452,485 | 6/1984 | Schuster . |
| 4,594,738 | 6/1986 | Gebert . |
| 4,627,661 | 12/1986 | Ronnhult et al. . |
| 4,696,203 | 9/1987 | Gregory . |
| 4,841,805 | 6/1989 | Italiano . |
| 4,847,973 | 7/1989 | Lundeen . |
| 4,850,084 | 7/1989 | Iwakaki . |
| 4,872,367 | 10/1989 | Spease . |
| 4,872,903 | 10/1989 | Periou . |
| 4,966,047 | 10/1990 | Krauer et al. . |
| 5,010,780 | 4/1991 | Hatfield . |
| 5,026,116 | 6/1991 | Dal Monte . |
| 5,039,138 | 8/1991 | Dickirson . |
| 5,138,898 | 8/1992 | Pospisil et al. . |
| 5,156,063 | 10/1992 | Kelley . |
| 5,197,780 | 3/1993 | Coughlin . |
| 5,217,278 | 6/1993 | Harrison et al. . |
| 5,245,886 | 9/1993 | Truesdell et al. . |
| 5,259,265 | 11/1993 | Gabas et al. . |
| 5,277,080 | 1/1994 | Roelle . |
| 5,293,785 | 3/1994 | Lichtenberg . |
| 5,307,707 | 5/1994 | Roelle . |
| 5,328,242 | 7/1994 | Steffens et al. . |
| 5,397,164 | 3/1995 | Schuster et al. . |
| 5,449,219 | 9/1995 | Hay et al. . |
| 5,462,335 | 10/1995 | Seyler . |
| 5,474,358 | 12/1995 | Maeyaert . |
| 5,518,294 | 5/1996 | Ligon, Sr. et al. . |
| 5,544,543 | 8/1996 | Hilgert et al. . |
| 5,553,919 | 9/1996 | Dennis . |
| 5,572,907 | 11/1996 | Kaakinen . |
| 5,638,722 | 6/1997 | Klingler . |

FOREIGN PATENT DOCUMENTS

| | | |
|---|---|---|
| 688897 | of 1953 | United Kingdom . |
| 765877 | 1/1957 | United Kingdom . |
| 895195 | 5/1962 | United Kingdom . |
| 1235925 | 9/1971 | United Kingdom . |
| 2013487A | 8/1979 | United Kingdom . |
| 2013816A | 8/1979 | United Kingdom . |
| 2151758A | 7/1985 | United Kingdom . |
| WO 94/00039 | 1/1994 | WIPO . |
| WO 94/07393 | 4/1994 | WIPO . |
| WO 95/01115 | 6/1994 | WIPO . |
| WO 94/25307 | 11/1994 | WIPO . |
| WO 95/00053 | 1/1995 | WIPO . |

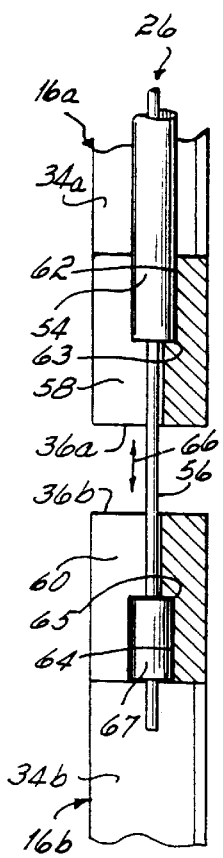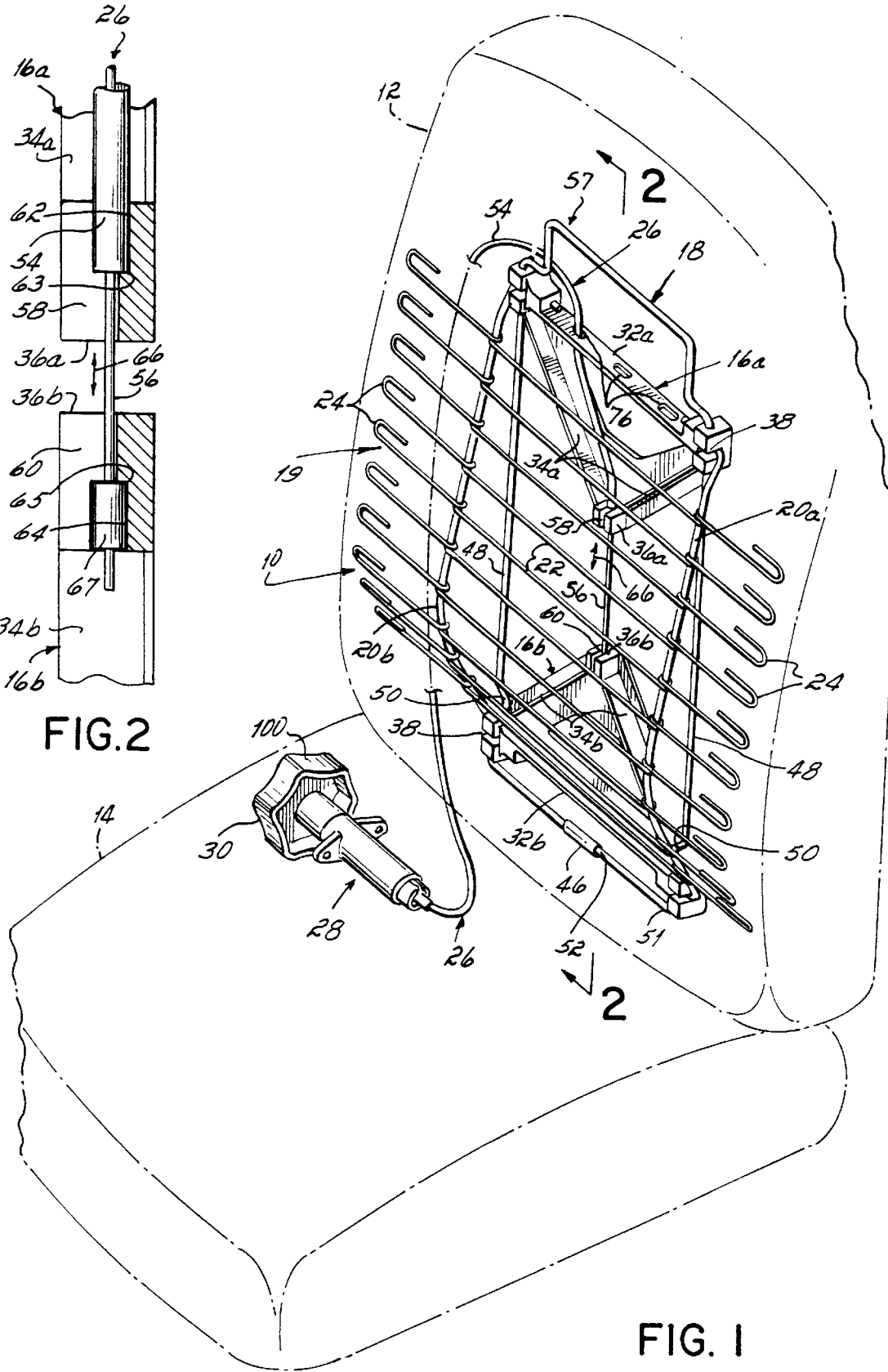
FIG. 2
FIG. 1

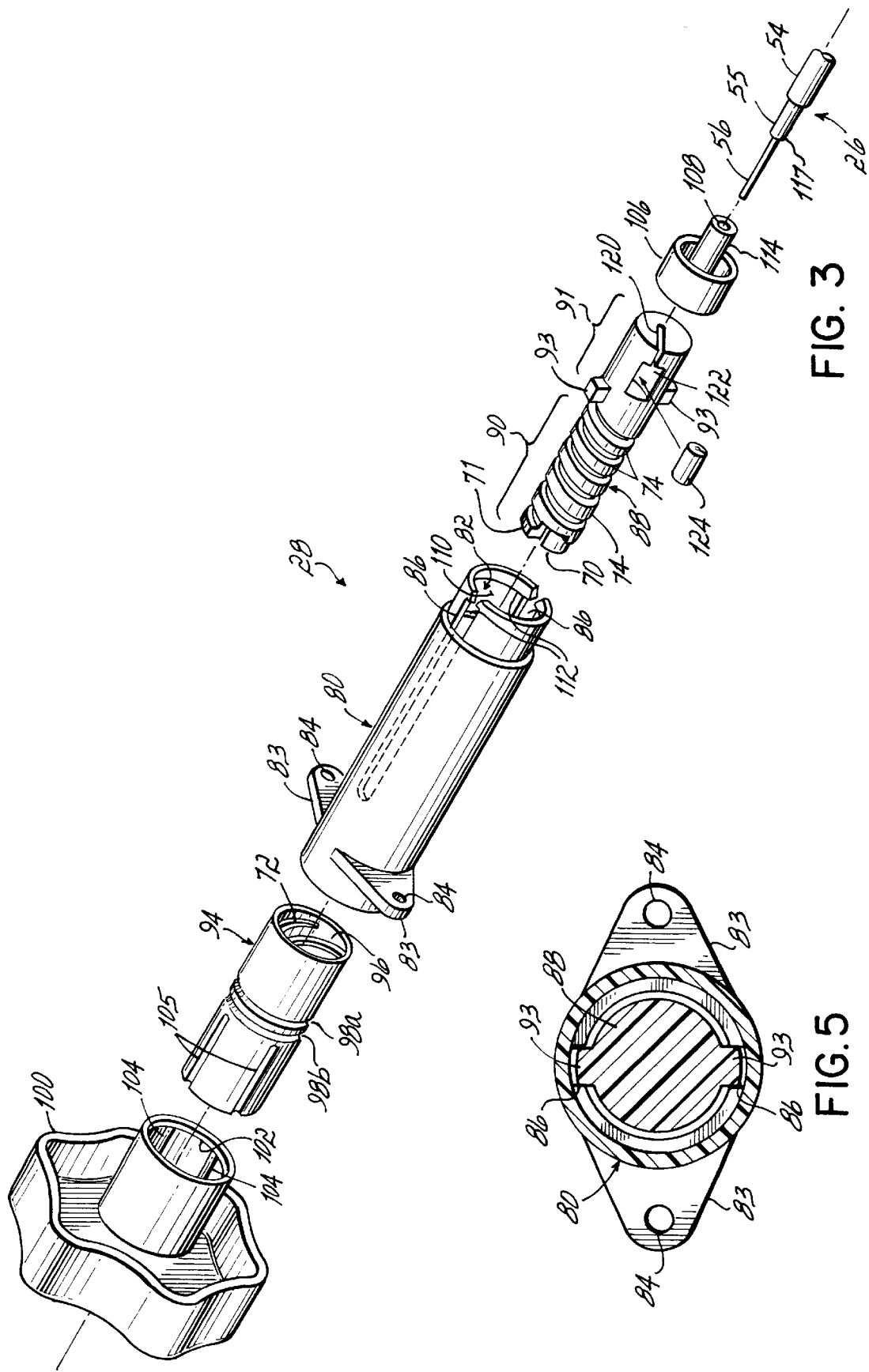

LUMBAR SUPPORT SCREW ACTUATOR

FIELD OF THE INVENTION

The present invention relates generally to lumbar supports for seats and particularly to an actuator for adjusting lumbar supports in the seats of automotive vehicles.

BACKGROUND OF THE INVENTION

In the interest of driver comfort within an automotive vehicle, such as a car, it is generally known to provide support to the lumbar region of the back. Lumbar support structures are placed within the lower region of the seat back proximate to where the lumbar region of the driver's back would be located. Lumbar support structures move an area of the seat back forwardly in a direction generally perpendicular to the horizontal surface of the seat back and against the lumbar region of the driver to support the lumbar region. By supporting the lower vertebral structures of the lumbar region, lumbar support structures support the upper back and provide comfort for drivers, particularly long distance drivers.

To move the lumbar support structure to a proper position, the structure is coupled to an actuator which is adjusted by the driver. The operation of the actuator will usually be determined by the construction of the lumbar support structure as well as the range of movement of the structure that is desired. As a result, a large number of actuators are currently utilized for adjusting lumbar support structures.

Several of the existing actuators for lumbar support structures utilize large numbers of complicated machine parts which increase the cost of manufacturing and installing the actuators, as well as their tendency to malfunction. Furthermore, even with such advanced mechanics, adjustment of available lumbar supports is often difficult. Some actuators utilize a handle which is turned by the driver for extending the lumbar support structure. Due to the construction of these lumbar support structures, the handle generally requires a substantial amount of torque in order to accomplish the desired adjustment. The required torque will oftentimes increase as the lumbar support structure is extended further. As may be appreciated, the turning of a handle with high torque would be difficult if not impossible to accomplish when a person is driving. Furthermore, drivers may be too weak to conveniently adjust the lumbar support structures, thus reducing their usefulness.

Motorized actuators are also available wherein the driver presses a series of buttons to actuate motors or air pumps to provide the movement of the lumbar support structure. While motorized actuators eliminate the physical requirements of the driver for providing such adjustment, they are generally expensive to manufacture. Furthermore, they are reliant upon a source of electricity and are subject to electrical failure which may render the lumbar support structure non-adjustable.

Another drawback to some existing lumbar support actuators is that many are not infinitely adjustable. For example, adjustments might be accomplished with a handle and a shaft which has a plurality of detents formed therein. Bearings or other suitable structures move into the detents when the handle is turned and a position is chosen. However, the lumbar support structures cannot be adjusted to positions in between the detents, and therefore, only a limited number of discreet positions of lumbar support are available. As may be appreciated, many drivers will not be comfortable at one of the discreet positions and would be more properly supported by a position somewhere therebetween.

Several available lumbar support structures utilize cables, referred to as bowden cables, to provide the necessary adjustment. In a bowden cable assembly, a wire cable is pulled through a sleeve having a fixed length which is fixed at its ends between two stationary elements. The cable is thus moved, while the sleeve is generally stationary, to effect relative movement of an element coupled to the cable with respect to another element coupled to the sleeve. Bowden cables are inexpensive and flexible and, because of their length, they provide various different positions for placement of an actuator. Thus, it is becoming ever more desirable in the field of lumbar supports to utilize actuators which operate with a bowden cable assembly.

Some attempts have been made to provide an economical manual lumbar support actuator, as evidenced by patents in the field. However, prior art actuators often are expensive to fabricate and difficult to assemble. Their construction requires precise alignment between the parts for coupling the actuator to a bowden cable assembly which slows down the assembly process. Furthermore, their assembly is generally more complicated than is desirable.

Accordingly, it is an objective of the present invention to provide an actuator for a lumbar support structure which is relatively inexpensive to manufacture and install.

It is another objective of the invention to provide easy assembly and operation in a lumbar support actuator.

It is another objective of the present invention to provide an actuator which provides smooth, easy adjustment of the lumbar support structure without a large amount of physical force from a driver.

It is another objective of the present invention to reduce the complication of a lumbar support structure actuator while providing infinite adjustment over the range of adjustment of the lumbar support structure.

It is still a further objective of the invention to actuate a lumbar support structure which meets the above objectives without reliance on a source of electricity and motorized adjustment.

SUMMARY OF THE INVENTION

In accordance with the above-discussed objectives and other objectives, the present invention provides an actuator for manipulating a bowden cable assembly of a lumbar support structure to vary the shape of the lumbar support structure. The actuator comprises a housing having a longitudinal passage formed therein and a screw positioned inside the housing which is operable for moving longitudinally within the passage. A threaded nut is positioned at one end of the housing and is connected to a handle to be manipulated and rotated by a driver. The nut is coupled to the screw and is operable for rotating with the handle and moving the screw longitudinally in the housing passage. An opening is formed in the screw which is configured for receiving the end of a bowden cable assembly for drawing the cable through the housing. That is, when the handle is turned by a driver, the screw pulls the cable through the housing.

For engaging the sleeve of the bowden cable assembly so that the cable may be drawn through the sleeve, the actuator of the present invention utilizes a barrel configured for receiving the sleeve. The barrel includes a bore formed therethrough into which the bowden cable assembly is received. The bore is operable to provide movement of the cable of the assembly completely therethrough while engaging the sleeve to prevent movement of the sleeve through the bore. To that end, the position of the sleeve is fixed with the barrel while the cable may be drawn by the screw through the barrel and housing passage. A detent is formed in the housing passage at the end of the housing passage opposite the nut coupled to the screw. The barrel engages the detent and locks into the detent to fix the movement of the bowden cable sleeve with respect to the housing. In that way, movement of the screw in the housing draws the cable through the barrel and through the fixed sleeve for manipulating the lumbar support structure.

Thereby, the lumbar support actuator of the present invention provides a design which is relatively inexpensive to manufacture and install. Furthermore, movement of the screw, by rotation of the handle and nut, is easily accomplished and provides infinite adjustment of the length of the cable with respect to the sleeve, and thus infinite adjustment of the lumbar support structure. The actuator is less subject to malfunction than other actuators involving complicated assemblies of parts. Furthermore, no source of electricity is required for providing adjustment to a lumbar support structure with the actuator.

In accordance with another aspect of the present invention, the lumbar support actuator provides for a simple, fast, and therefore inexpensive, assembly and installation. To that end, the screw opening extends radially into the screw and includes an axial passage which couples the opening with an end of the screw so that the cable may extend between the screw opening and the barrel. To assemble the actuator, the cable of the bowden assembly is inserted through the bore of the barrel while the bowden cable sleeve is engaged by the barrel. A stop structure is fixed to the end of the cable after it is inserted through the barrel. The stop structure is preferably shaped to fit into the screw opening for fixing the end of the cable with the screw. The screw is then inserted into the housing passage. In a preferred embodiment of the invention, the screw includes alignment feet positioned 180° from each other on the screw. The housing passage includes similarly positioned grooves therein which receive the alignment feet to prevent rotation of the screw in the housing as the screw is moved longitudinally. In that way, rotation of the threaded nut moves the screw longitudinally rather than rotating the screw in the housing.

The screw includes a thread stop at one end for locking the screw with the nut after the screw has been positioned in the housing and threaded into the nut. The thread stop is formed on the screw and is specifically formed adjacent to the endmost thread on the screw opposite the end which is coupled to the cable. The thread stop is flexible and generally flexes inwardly when the screw is threaded into the nut in one direction. When the screw endmost thread passes the last thread of the nut, as it travels therethrough, the flexible thread stop flexes outwardly to engage the end of the last nut thread. The thread stop on the screw and last thread of the nut abut each other to then prevent the screw from being threaded back out of the nut in the opposite direction. In that way, the screw is locked into the nut. The screw will move in both directions in the nut to move the cable. However, the end of the screw opposite the cable and barrel will stay locked in the nut to keep the assembly together. No additional fastening structures are necessary. After the screw has been inserted to engage the nut, the barrel is physically pushed into the detent in the housing to lock therein and thereby fix movement of the bowden cable sleeve with respect to the housing. In that way, when the cable is drawn through the housing, the position of the cable is changed with respect to the sleeve and actuation and adjustment of the lumbar support structure is provided.

BRIEF DESCRIPTION OF THE DRAWINGS

The accompanying drawings, which are incorporated in and constitute a part of this specification, illustrate embodiments of the invention and, together with a general description of the invention given below, serve to explain the principles of the invention.

FIG. 1 is a perspective view of the present invention incorporated into an automotive vehicle seat;

FIG. 2 is a cross-sectional view along lines 2—2 of FIG. 1.

FIG. 3 is an exploded view of the actuator of the invention.

FIG. 5 is a cross sectional view along lines 5—5 of FIG. 4A.

DETAILED DESCRIPTION OF THE INVENTION

Figure 4A:
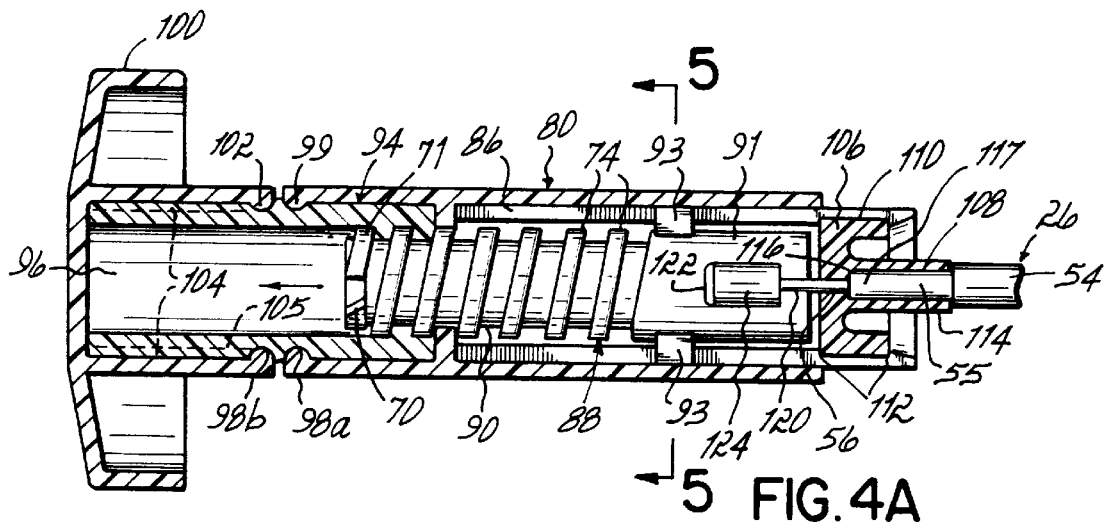
FIG. 4A is a side view, in partial cross-section, of the inventive actuator with the cable in the relaxed position.

The actuator of the present invention is operable for actuating a lumbar support structure which is coupled to a bowden cable assembly. One such lumbar support structure is illustrated in U.S. patent application, Ser. No. 08/864,953, which is incorporated by reference herein in its entirety. The lumbar support structure is described herein for purposes of illustrating one embodiment of the invention. FIG. 1 illustrates such a lumbar support structure 10 and is a perspective view showing the lumbar support structure incorporated into the seat back 12 of an automotive seat. A person, such as a driver, sitting on the bottom 14 of the seat will be provided lumbar support by structure 10 when it is bowed or flexed. The structure 10 is shown as being visible in FIG. 1, for illustrative purposes only. As is conventional in the art, the lumbar support structure will generally be covered by the fabric and batting material of seat back 12, and thus will not be visible to the seat's occupant, but still be left in the lumbar region.

Structure 10 includes a pair of opposing triangular or triangularly-shaped brackets 16a, 16b which are formed of a rigid material, such as plastic or some other suitable lightweight, durable, and rigid material. Brackets 16a, 16b are coupled together by a base wire structure 18 which preferably engages both of the brackets 16a and 16b to hold them in a suitable spatial relationship and to further provide a base for the lumbar support structure 10. Border elements 20a and 20b are also coupled to the triangular brackets 16a and 16b for providing the border for a support grid 19 of the lumbar support structure. The support grid 19 further comprises transverse wire members 22 which extend generally perpendicular to the border elements 20a, 20b and therebetween to further complete the support grid for the lumbar support structure 10. The transverse wire elements 22 are generally wrapped around the border elements 20 for securement as illustrated in the FIG. 1. The ends 24 of the transverse wire elements 22 are then bent 180° to provide smooth ends which will not snag or otherwise puncture the material and batting of the seat back 12. In an alternative embodiment, the transverse wire elements 22 may stop at the border elements 20 instead of continuing out to the ends 24. The lumbar support structure 10 is actuated preferably by a bowden cable assembly 26 which draws the triangular brackets 16a, 16b together to bow the border elements 20a, 20b and thus bow the entire lumbar support grid 19. The bowden cable assembly 26 is coupled to the actuator 28 of the present invention which pulls a wire within the sheath or sleeve of the bowden cable assembly 26 as discussed further hereinbelow. Actuator 28, in turn, is coupled to a knob or handle 30 for manually operating the actuator 28 and bowing or relaxing support grid 19 to adjust the grid support.

The triangular brackets 16a, 16b essentially each have a base 32a, 32b, two rigid side elements or sides 34a, 34b, and peaks 36a, 36b. When assembled within the lumbar support mechanism 10 of the invention, triangular brackets 16a, 16b are opposing each other and are placed so that their bases 32a, 32b are on opposite ends of the structure 10 while their peaks 36a, 36b are generally adjacent or face each other for interaction with the bowden cable assembly 26, as discussed further herein below. That is, one triangular bracket 16a points downwardly and another triangular bracket 16b points upwardly. In assembling the lumbar support structure 10, the border elements are attached into pivot slots 38 formed at either end of the base of the triangular brackets (see FIGS. 1 and 3). The border elements 20a, 20b which are preferably border wires, are bent at preferably 90° at approximately 1.25 inches from their ends to form pivot legs 40. The pivot legs 40 fit into the pivot slots 38 to provide the pivot points for the border elements when the lumbar grid is bowed, as illustrated in FIGS. 2 and 3. That is, the pivot legs 40 rotate within the pivot apertures 42 of the triangular brackets without binding to provide smooth, quiet and easy bowing and relaxing of the lumbar support structure 10. Referring to FIG. 5, the pivot slots are juxtaposed pivot openings or apertures (not shown) which are formed in the ends of the base of the triangular brackets 16a, 16b (i.e., the base corners of the triangular bracket) and extend generally parallel to the base. When lumbar grid 19 of the invention is assembled, the brackets 16a, 16b can be rotated to an angle to allow the border wires 20a, 20b to slide into the pivot slots 38. Next, insertion of the opposite border wire may be accomplished. The brackets are then positioned so that the peaks 36a, 36b are adjacent each other within the grid 19. The brackets will be centered in the grid, with the peaks proximate the longitudinal and transverse middle of grid 19.

To secure the border wires 20a, 20b in the brackets 16a, 16b, the base wire structure 18 is inserted into openings or apertures 44 formed in the base corners of the triangular bracket, and extending generally perpendicular to slots 38 and openings 42. The base wire structure 18 fits first through the openings 44 of the upper triangular bracket 16a and then through the openings in bracket 16b. Preferably, the base wire structure 18 is a single wire structure which is overlapped and clipped at its ends 52 such as by a clip 46 proximate the overall base of the lumbar grid 19. In that way, side elements 48 of the base wire structure 18 extend generally parallel to the border wires 20a, 20b as illustrated in FIGS. 2 and 5. Insertion of the base wire structure locks the border wires 20a, 20b into the brackets 16a, 16b. Dimples 50 are formed in the base wire structure proximate the base 32b of triangular bracket 16b for maintaining bracket 16b generally stationary or fixedly coupled with respect to the lumbar grid 19.

The combination of the dimples 50 and the bends 51 made in the border wire structure 18 prior to the overlapped ends 52 and clip 46 will generally secure the bracket 16b at the base of the lumbar grid 19. Bracket 16a is not secured in such a way, and therefore bracket 16a is moveably coupled to base wire structure 18 to slide up and down on the vertical border wire sections 48 to provide for bowing, relaxing, and flexing of the lumbar grid 19 under load. The upper section 55 of the base wire structure is appropriately formed for attaching the lumbar support structure 10 of the invention to a seat frame, as illustrated in FIG. 1. Section 55 may be lengthened and dimensioned to enable the mounting of the mechanism 10 with any seat frame back.

As mentioned above, lumbar support structure 10 is actuated by a bowden cable assembly 26, which includes a sleeve 54 and a cable 56. The bowden cable assembly 26 is anchored to the triangular brackets 16a, 16b with the sleeve anchored to one bracket 16a and the cable anchored to another bracket 16b. Referring to FIG. 2, a cross-section of the juxtaposed or adjacent peaks 36a, 36b of the brackets is illustrated. At peak 36a of bracket 16a, the cable extends through a slot or aperture 58 which is generally aligned with a slot or aperture 60 in peak 36b when the lumbar grid 19 is assembled. Slot or aperture 58 includes a larger diameter portion 62 which forms a shoulder 63. Generally, the brackets 16a and 16b will be similarly fabricated so that they will be interchangeable within the lumbar support grid 19 of the invention. Accordingly, slot or aperture 60 also includes a larger diameter portion 64 with a shoulder 65. Within bracket 16a, the end of the sleeve 54 engages the shoulder 63 so that sleeve 54 is secured within bracket 16a and prevented from moving in the vertical direction 66 with respect to bracket 16a. At the end of cable 56, a barrel clip or other suitably shaped stop structure 67, is fixed for engaging shoulder 65. Therefore, the end of cable 56 is fixed with respect to bracket 16b. As illustrated in FIG. 1, the actuator 28 is operable for pulling cable 56 within sleeve 54 to bow the lumbar grid 19 or may relax the cable within the sheath for relaxing the grid. For example, knob or handle 30 might be turned clockwise or counter clockwise to move cable 56. Generally, the actuator 28 will be readily accessible to the driver for adjusting the lumbar support mechanism.

More specifically, actuator 28 is used to draw cable 56 through the sleeve 54 of the bowden cable assembly 26. In doing so, the end of cable 56 containing the stop structure 67 is drawn toward the end of sleeve 54 at shoulder 63. Stop structure acts on shoulder 65 and sleeve 54 acts on shoulder 63 to draw or otherwise move the peaks 36a, 36b of the brackets together and thus move the brackets themselves together. In doing so, the distance between the bases 32a, 32b of respective brackets is shortened. Bracket 16a moves while bracket 16b is generally stationary.

FIG. 3 shows an exploded view of the actuator 28 of the invention coupled to a Bowden cable assembly 26 including a sleeve 54 and cable 56. Sleeve 54 is preferably formed of metal and is covered by an appropriate outer plastic covering or outer sleeve 55. Actuator 28 includes a generally cylindrically shaped housing 80 which is preferably formed of a suitable lightweight plastic or metal material. Housing 80 has a longitudinal passage 82 formed therethrough and includes mounting tabs 83 on either side thereof with apertures 84 for mounting the actuator in a vehicle seat. Formed in the housing are two alignment grooves 86 preferably positioned 180° apart from each other in the housing 80. A plastic screw 88 is configured for positioning within the longitudinal passage 82 of housing 80. Screw 88 is preferably formed of plastic and includes a threaded portion 90 at one end and a cable engagement portion 91 at the other end. Between the threaded portion 90 and cable engagement portion 91, the screw includes two alignment feet 93 which are positioned generally 180° apart on the screw. When screw 88 is positioned in the housing passage 82, the alignment feet 93 are aligned with the alignment grooves 86. In that way, screw 88 is moved longitudinally in housing 80 without rotating, as described further hereinbelow.

Figure 4B:
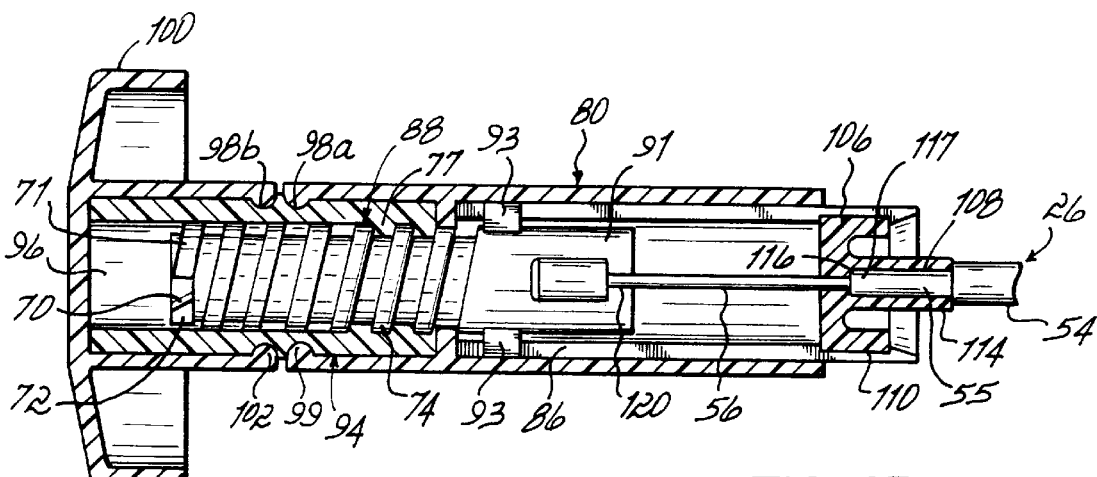
FIG. 4B is a side view, in partial cross-section, of the inventive actuator with the cable in the drawn position.

To engage the threaded portion 90 of screw 88, the actuator 28 includes a threaded nut 94 which includes an internally threaded passage 96 for engaging the threaded end portion 90 of screw 88. Nut 94 includes annular grooves 98a, 98b for coupling with other members of the actuator. Referring to FIGS. 4A and 4B, the housing includes an annular lip 99 which snaps into groove 98a when a portion of the nut is mounted into housing 80. A handle 100 for turning nut 94 also has an annular lip 102 which snaps into groove 98b to couple the housing 80, screw 94, and handle 100 together. To receive one end portion of nut 94, the handle 100 includes an internal passage 103 which surrounds one end of nut 94. Passage 103 includes key elements 104 which fit into key slots 105 in the nut 94 for rotationally fixing handle 100 with respect to nut 94. That is, when handle 100 rotates, nut 94 also rotates.

When handle 100 is rotated, screw 88 is drawn through housing 80 longitudinally and is prevented from rotating by engagement of the alignment feet 93 in the alignment grooves 86 as illustrated in FIG. 5. In that way, the handle 100 and nut 94 are rotated, and the rotational movement is converted into translational movement by the movement of screw 88 within the housing 80. The threads of the nut 94 draw the screw portion 90 to pull the screw through the housing.

In accordance with another feature of the present invention, the actuator 28 is easily and readily coupled to the bowden cable assembly 26. Referring to FIG. 3, actuator 28 includes a barrel 106 configured for receiving bowden cable assembly 26. The barrel 106 includes a bore 108 formed therethrough. Bore 108 is dimensioned to provide movement of the cable 56 completely therethrough while engaging the sleeve 54 (which may include plastic jacket 55) to prevent movement of the sleeve completely through the barrel bore 108 (see FIGS. 4A and 4B). Referring to FIG. 4A, housing 80 includes a detent 110 formed therein in the end of the housing opposite nut 94 and handle 100. Detent 110 preferably extends around the housing passage 82 and includes annular shoulders 112 on either side thereof. The detent 110 is configured for receiving the cylindrically-shaped barrel 106. As illustrated in FIG. 4A, the barrel 106 engages the detent 110 and locks into the detent between the shoulders 112 to fix the movement of the barrel 106 with respect to housing 80 In that way, the movement of the bowden cable sleeve 54 is also fixed with respect to housing 80.

For the operation of actuator 28, bowden cable 56 is drawn through housing 80 while the sleeve 54 is maintained in a stationary position with respect to housing 80, thereby providing adjustment to the lumbar support structure 10, as illustrated in FIGS. 1 and 2. Referring to FIG. 4A, barrel 106 is shown snapped into the detent 110 to fix its movement with respect to the housing 80. Barrel 106 includes a collar 114 which engages sleeve 54 of the cable assembly 26 to prevent movement of the sleeve with respect to the housing. Collar 114 defines a shoulder 116 which engages a front end 117 of the sleeve 54 and jacket 55 to prevent further movement through bore 108. In that way, cable 56 moves all the way through bore 108 while sleeve 54 moves only through a length of bore 108 as defined by collar 114.

Actuator 28 must be coupled to cable 56 for providing actuation of the lumbar support structure 10. More specifically, the cable engagement portion 91 of screw 88 must be fixed to an end of cable 56. To that end, cable 56 is inserted through bore 108 and extends through an axial opening 120 in the cable engagement portion of 91. Axial opening 120 communicates with a radial screw opening 122. For fixing cable 56 to the screw 88, a stop structure, such as barrel clip 124, is clamped to the end of the cable 56 after it has been inserted through barrel 106. Barrel clip 124 is rigidly fixed to the end of cable 56 and may be soldered for providing further securement to the cable 56. Preferably opening 122 is formed to receive the barrel clip 124, or any other similar stop structure which might be fixed to the end of the cable 56. The axial opening 120 between the end of the screw and the radial opening 122 is in the form of a slot. The slot 120 is dimensioned to allow passage of cable 56 but to prevent passage of barrel clip 124 so that cable 56 may be drawn by screw 88. Barrel clip 124 or the end of cable 56 is inserted into the radial opening 122 and cable 56 is moved to the slot so that cable 56 and, indeed, the entire bowden cable assembly 26 is in axial alignment with screw 88 and with its longitudinal movement through the housing 80. When screw 88 is moved longitudinally by rotation of handle 100 and nut 94, cable 56 is drawn through the barrel 106 and through the sleeve 54 which is fixed by the collar 114 of the barrel. In that way, cable 56 is moved with respect to the stationary sheath 54. Referring to FIG. 4A, the actuator is shown with the cable in the relaxed position wherein the screw is in a forwardmost position within the housing. FIG. 4B illustrates the actuator with the bowden cable in the drawn position; that is, screw 88 has been drawn by rotation of handle 100 to pull the cable 56 through the sheath 54 and jacket 55. As illustrated in FIGS. 4A and 4B, only the outer jacket 55 which surrounds the sheath is shown. As will be appreciated, collar 114 of the barrel 106 should be dimensioned to contain sleeve 54 and jacket 55. When cable 56 is drawn longitudinally in the housing 80 by screw 88, the sheath of the bowden cable is maintained in the stationary position with respect to the housing 80 by barrel 106. As the cable 56 is drawn, the lumbar support structure 10 is adjusted for proper lumbar support of a driver as discussed hereinabove.

In accordance with another aspect of the present invention, the screw 88 is held within nut 94 by a thread stop structure on the screw. In that way, once the actuator is assembled, it generally cannot be easily disassembled. This reduces any inadvertent disassembly of the actuator during operation.

Referring to FIGS. 4A, 4B, 6, 7A and 7B, the screw 88 includes a thread stop 70 formed proximate the endmost thread 71 of the screw which is engaged by threads 72 of the nut 94. The thread stop 70 is radially flexible and is preferably machined into the body of screw 88 proximate thread 71.

Figure 7A:
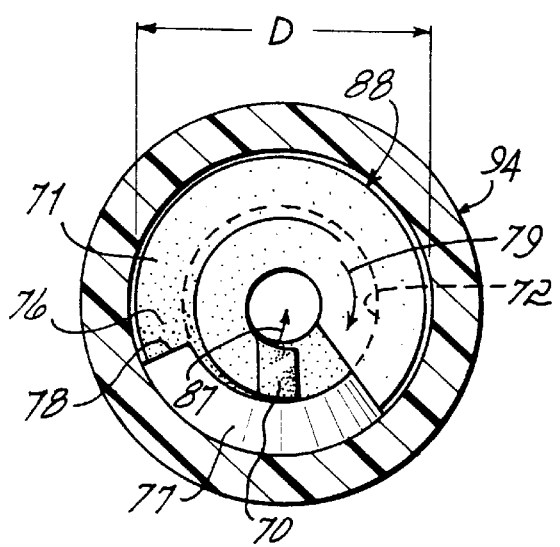
FIGS. 7A and 7B are end cross-sectional views of the screw and nut of the invention shown with the thread stop in an engaged and disengaged position, respectively.

The thread stop 70, as seen in FIG. 7, extends radially outwardly toward the outermost diameter D of the screw threads 74. The width of the thread stop 70 along the length of screw 88 is greater than the width of the screw threads 74, and therefore, thread stop 70 spans generally across the space 76 normally provided between adjacent screw threads 74 to interfere with the nut threads and effectively block passage of nut threads thereby (see FIGS. 7A, 4B). In that way, the thread stop 70 effectively locks the screw 88 within nut 94.

Figure 6:
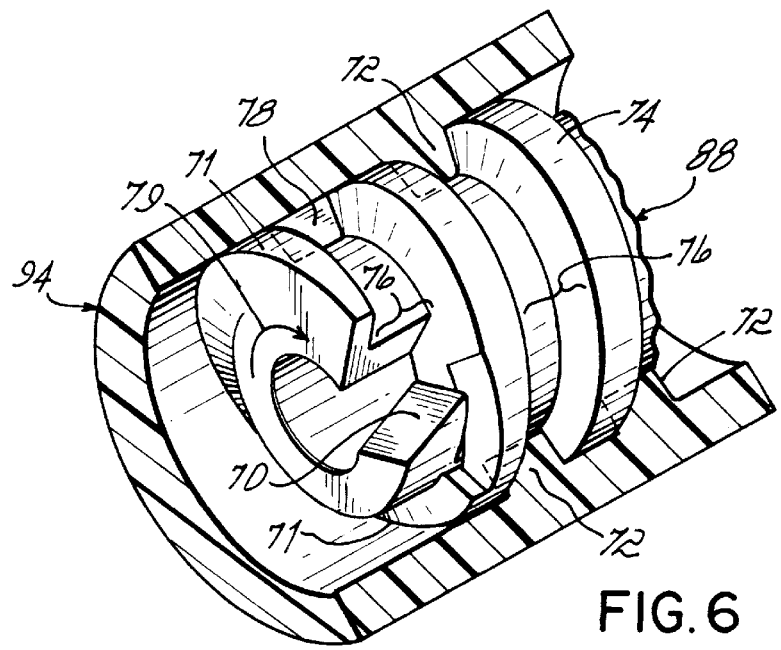
FIG. 6 is a perspective view showing the screw of the invention with the thread stop and the nut in partial cross-section.

More specifically, during assembly of the actuator, screw 88 is threaded into nut 94, such as in a clockwise direction 79 as shown in FIG. 7A. When the endmost threads 71 and thread stop 70 pass the various threads 72 of nut 94, the thread stop 70 flexes radially inwardly as shown in FIGS. 6 and 7A by arrow 87. This inward radial flexing is caused by the fact that the thread stop is wide enough to span across the space 76 so that the nut threads 72 engage the thread stop 70 and push it radially inwardly as the screw is moved in the rotating nut. Since the thread stop is flexible, it will flex in the radially inward direction. Eventually, when the screw is threaded far enough in the nut, the endmost screw thread 71 and the thread stop 70 will pass the endmost nut thread 77.

Figure 7B:
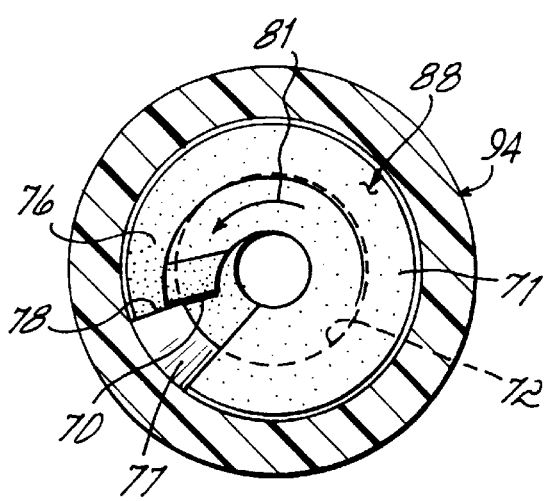

The end surface of the nut threads is indicated in FIGS. 7A, 7B by reference numeral 78 The nut threads stop at surface 78. When the thread stop 70 passes the end surface 78, the thread stop will not be held radially inwardly anymore by the nut threads and will flex radially outwardly to its outermost radial position, as shown in FIG. 7B. As shown in FIG. 7B, it will be flexed into engagement with the thread end surface 78. More specifically, stop 70 flexes into the path of surface 78. When the nut is rotated clockwise 81, such as to move the cable, the thread stop 70 will engage end surface 78 and the nut is prevented from rotating any further in the clockwise direction. That is, the screw is prevented from being threaded back out of the nut. In that way, the screw and nut are secured together once the screw thread stop engages the nut thread surface 78. The screw will move within the nut to draw the cable 56 as shown in FIGS. 4A, 4B; however, the screw will not move completely out of the nut once the thread stop 70 has been engaged with surface 78. The general face-to-face engagement between the thread stop 70 and the thread end surface 78 will prevent the screw from being moved out of the nut and will stop the nut from being rotated any further in the clockwise direction, because the thread stop will not be flexed back in the radially inward direction.

Actuator 28 of the invention is relatively inexpensive to manufacture and install. Furthermore, actuator 28 is easily assembled. Once the housing 80, nut 94, and handle 100 have been snapped together, the housing 80 is ready to receive screw 88, barrel 106, and the bowden cable assembly 26. To that end, the end of cable 56 is inserted into the barrel bore 108 to extend completely through the barrel. The stop structure, such as barrel clip 124, is fixed to the end of cable 56 so that the cable 56 may not be pulled back through barrel bore 108. Thereafter, barrel clip 124 and the end of cable 56 are inserted into the radial opening 122 to extend through the axial opening or slot 120. Screw 88 is then inserted into housing 80 with proper alignment between feet 93 and grooves 86. Nut 94 is turned to properly engage the screw 88 and to further draw the bowden cable assembly 26 into the end of the housing 80. Barrel 106 is then easily and conveniently snapped into the detent 110 formed in the end of housing 80. Once the barrel is snapped into place and is properly contained by shoulders 112, the actuator 28 is ready for operation for adjusting the lumbar support structure.

Actuator 28 provides a smooth, easy adjustment of lumbar support structure without a large amount of physical force from the driver. Furthermore, actuator 28 provides a generally infinite adjustment of the lumbar support structure within the range defined by the movement of screw 88 in the housing 80. Actuator 28 has an uncomplicated construction and may be readily and inexpensively fabricated.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

It is claimed:

1. An actuator for manipulating a bowden cable assembly of a lumbar support structure for varying the shape of the lumbar support structure, the actuator comprising:
   a housing having a longitudinal passage formed therein;
   a screw positioned inside the housing and operable for moving longitudinally in the housing passage;
   a threaded nut positioned at one end of the housing, the nut being coupled to the screw and operable for rotating and moving said screw longitudinally through the housing passage;
   an opening formed in the screw and configured for receiving the end of a cable of a bowden cable assembly for drawing the cable through the housing passage;
   a barrel configured for receiving a bowden cable assembly, the barrel operable for providing movement of the cable of a bowden cable assembly completely therethrough and through the housing passage and further operable for engaging a sleeve of the bowden cable assembly for preventing movement of the sleeve completely therethrough;
   the barrel fixedly coupled to the housing to fix the movement of the bowden cable sleeve with respect to the housing passage;
   movement of said screw in the housing operable for drawing the cable through the fixed sleeve of the bowden cable structure for manipulating a lumbar support structure.

2. The actuator of claim 1 further comprising a detent formed in the housing, the detent configured for receiving said barrel to fixedly couple the barrel to the housing.

3. The actuator of claim 1 wherein said screw opening extends radially into said screw, an axial passage coupling said opening with an end of the screw so that the cable may extend between the screw opening and the barrel.

4. The actuator of claim 1 wherein said barrel includes a bore, the bore operable for allowing movement of the cable completely therethrough and preventing movement of the sleeve completely therethrough.

5. The actuator of claim 1 wherein said barrel includes a collar defining a portion of said barrel bore, the collar operable for engaging the sleeve to prevent movement of the sleeve completely therethrough.

6. The actuator of claim 1 wherein said screw includes an alignment foot on a side thereof, the housing passage including a groove therein for receiving said foot, the foot and groove operable for preventing rotation of said screw in the housing as the screw is moved longitudinally.

7. The actuator of claim 1 wherein the housing includes an annular lip formed within said passage at one end of the housing, a portion of the threaded nut being insertable into said passage and including an annular groove configured for receiving the annular lip to couple the nut and housing together.

8. The actuator of claim 1 further comprising a thread stop coupled with the screw, the thread stop operable to engage a thread of the nut and prevent the screw from being moved completely out of the nut when the nut is rotated.

9. The actuator of claim 8 wherein said thread stop is formed on the screw.

10. An actuator for manipulating a bowden cable assembly of a lumbar support structure for varying the shape of the lumbar support structure, the actuator comprising:

a housing having a longitudinal passage formed therein;

a screw positioned inside the housing and operable for moving longitudinally in the housing passage;

a threaded nut positioned at one end of the housing, the nut being coupled to the screw and operable for rotating and moving said screw longitudinally through the housing passage;

an opening formed in the screw and configured for receiving the end of a cable of a bowden cable assembly for drawing the cable through the housing passage;

a thread stop coupled with the screw, the thread stop operable to engage a thread of the nut and prevent the screw from being moved completely out of the nut when the nut is rotated;

whereby the actuator is maintained in an assembled state.

11. The actuator of claim 10 further comprising a barrel configured for receiving said bowden cable assembly, the barrel operable for providing movement of the cable of said bowden cable assembly completely therethrough and through the housing passage and further operable for engaging a sleeve of the bowden cable assembly for preventing movement of the sleeve completely therethrough;

the barrel fixedly coupled to the housing to fix the movement of the bowden cable sleeve with respect to the housing passage;

movement of said screw in the housing operable for drawing the cable through the fixed sleeve of the bowden cable assembly for manipulating a lumbar support structure.

12. The actuator of claim 10 wherein said thread stop is formed on the screw.

13. The actuator of claim 10 wherein said thread stop includes a flexible portion, the flexible portion operable for flexing inwardly when the nut is rotated in one direction and the screw moves longitudinally through the housing, the flexible portion further operable for flexing outwardly to engage said nut thread to prevent the screw from moving completely out of the nut.

14. The actuator of claim 10 wherein said thread stop is formed at an end of the screw opposite the opening.

15. A method of manipulating a bowden cable assembly of a lumbar support structure to vary the shape of the lumbar support structure, the method comprising:

fixing an end of a cable of a bowden cable assembly to an end of a screw;

positioning the screw inside a longitudinal passage of a housing so that the screw is operable for moving longitudinally in the housing passage to draw the cable through the housing passage;

engaging the cable with a barrel, the barrel operable for providing movement of the cable completely therethrough and through the housing passage;

engaging a sleeve of the bowden cable assembly with the barrel, the barrel operable for preventing movement of the sleeve completely therethrough and thereby preventing movement of the sleeve with respect to the barrel;

fixedly coupling the barrel to the housing to fix the movement of the bowden cable sleeve with respect to the housing;

moving said screw in the housing to draw the cable through the housing passage and through the fixed sleeve of the bowden cable structure for manipulating a lumbar support structure.

16. The method of claim 15 further comprising fixedly coupling the barrel to the housing by inserting the barrel in a detent formed in the housing.

17. The method of claim 15 wherein said barrel includes a bore, the bore operable for allowing movement of the cable completely therethrough and preventing movement of the sleeve completely therethrough.

18. The method of claim 15 wherein said barrel includes a collar, the collar operable for engaging the sleeve to prevent movement of the sleeve completely therethrough.

19. The method of claim 15 wherein said screw includes an alignment foot on a side thereof, the housing passage including a groove therein for receiving said foot, the foot and groove operable for preventing rotation of said screw in the housing as the screw is moved longitudinally.

* * * * *

UNITED STATES PATENT AND TRADEMARK OFFICE
CERTIFICATE OF CORRECTION

PATENT NO. : 6,053,064
DATED : April 25, 2000
INVENTOR(S) : John P. Gowing et al It is certified that error appears in the above-identified patent and that said Letters Patent is hereby corrected as shown below:

In column 7, line 49, "housing 80 In" should read
---housing 80.  In---.

In column 11, line 40, "claim 10" should read
---claim 12---.

Signed and Sealed this

Fifteenth Day of May, 2001

Attest:

NICHOLAS P. GODICI

*Attesting Officer*    *Acting Director of the United States Patent and Trademark Office*